United States Patent

He et al.

(10) Patent No.: US 7,823,787 B2
(45) Date of Patent: Nov. 2, 2010

(54) SWIPE IMAGER SCAN ENGINE

(75) Inventors: Duanfeng He, South Setauket, NY (US); Warren Zuelch, Wantagh, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 11/870,592

(22) Filed: Oct. 11, 2007

(65) Prior Publication Data

US 2008/0023560 A1 Jan. 31, 2008

Related U.S. Application Data

(63) Continuation of application No. 11/263,520, filed on Oct. 31, 2005, now Pat. No. 7,296,744.

(51) Int. Cl.
G06K 7/10 (2006.01)
(52) U.S. Cl. .................................. 235/462.42
(58) Field of Classification Search ............. 235/462.42
See application file for complete search history.

(56) References Cited

U.S. PATENT DOCUMENTS

| 3,716,752 | A | | 2/1973 | Iwata |
| 4,302,084 | A | | 11/1981 | Greenwald et al. |
| 4,743,773 | A | * | 5/1988 | Katana et al. .......... 235/462.07 |
| 5,278,397 | A | | 1/1994 | Barkan et al. |
| 5,744,790 | A | | 4/1998 | Li |
| 5,804,805 | A | | 9/1998 | Koenck et al. |
| 6,073,851 | A | | 6/2000 | Olmstead |
| 6,184,534 | B1 | | 2/2001 | Stephany et al. |
| 6,213,399 | B1 | * | 4/2001 | Tsi et al. .................. 235/462.08 |
| 6,923,374 | B2 | | 8/2005 | Knowles et al. |
| 7,204,418 | B2 | | 4/2007 | Joseph et al. |
| 7,296,744 | B2 | | 11/2007 | He et al. |
| 2002/0134835 | A1 | | 9/2002 | Kennedy |
| 2002/0148901 | A1 | | 10/2002 | Barkan et al. |
| 2003/0089776 | A1 | * | 5/2003 | Hennick et al. ............. 235/454 |
| 2003/0136843 | A1 | | 7/2003 | Ralph et al. |
| 2005/0103851 | A1 | * | 5/2005 | Zhu et al. ............... 235/462.11 |
| 2005/0116041 | A1 | | 6/2005 | Zhu et al. |

FOREIGN PATENT DOCUMENTS

WO 2006062818 A3 6/2006

OTHER PUBLICATIONS

International Search Report for PCT International No. PCT/US05/043618, Jun. 15, 2006.
First Chinese Office Action for Chinese Application No. 200580042303.9 dated Apr. 3, 2009, a foreign counterpart of U.S. Appl. No. 11/870,592.
English Translation of First Chinese Office Action for Chinese Application No. 200580042303.9 dated Apr. 3, 2009, a foreign counterpart of U.S. Appl. No. 11/870,592.
Office Action for US Patent No. 7,204,418 dated Sep. 20, 2005, the parent of U.S. Appl. No. 11/870,592.

(Continued)

Primary Examiner—Steven S Paik
Assistant Examiner—Tae Kim

(57) ABSTRACT

An imaging scan engine includes both a solid-state camera and an illumination source in the same package. The scan engine unit simplifies the integration of swipe imaging components into new and existing scanners.

23 Claims, 2 Drawing Sheets

OTHER PUBLICATIONS

Office Action for US Patent No. 7,204,418 dated Mar. 27, 2006, the parent of U.S. Appl. No. 11/870,592.
Office Action for US Patent No. 7,204,418 dated Jul. 26, 2006, the parent of U.S. Appl. No. 11/870,592.
Notice of Allowance for US Patent No. 7,204,418 dated Dec. 4, 2006, the parent of U.S. Appl. No. 11/870,592.
Office Action for US Patent No. 7,296,744 dated May 1, 2007, a related patent.
Notice of Allowance for US Patent No. 7,296,744 dated Aug. 13, 2007, a related patent.
International Preliminary Report on Patentability and the Written Opinion of the International Searching Authority for PCT/US2005/41141 dated Jun. 13, 2007, a foreign counterpart.
European Office Action for European Application No. 05852752.4 dated Nov. 11, 2008, a foreign counterpart.

* cited by examiner

SWIPE IMAGER SCAN ENGINE

CROSS REFERENCE TO RELATED APPLICATIONS

This application is a divisional of application serial no. 11/263,520, filed Oct. 31, 2005, which is a continuation-in-part of application serial no. 11/007,403, filed Dec. 8, 2004, now issued as U.S. Pat. No. 7,204,418 on Apr. 17, 2007. Both application Ser. Nos. '520 and '403 are incorporated by reference herein in their respective entireties.

TECHNICAL FIELD

The invention relates generally to the field of imaging scanners and more particularly to scan engine components for use in imaging scanners.

BACKGROUND OF THE INVENTION

Swipe scanners are defined as scanners that can successfully scan an indicium while it is in motion. Traditionally, scanners that are used in swipe type applications are laser scanners. This is because the laser scanning technology utilizes a fast sweeping flying laser spot to do the scanning. The flying laser spot typically moves at a much faster speed than the object bearing the indicium could move. The speed of the indicium is usually governed by the arm or hand motion of an operator, and such motion is typically in the range of 25 inches per second. Laser scanners can achieve high throughput scanning of 1-dimensional barcodes and some types of 2-dimensional barcodes, such as PDF-417 barcodes, but they are generally not effective at scanning general 2-dimensional barcodes or matrix codes such as DataMatrix.

In the last several years imaging scanners also know as "imagers" in this context have picked up a sizable market share of the scanner market that is traditionally served by laser scanners. While 1-dimensional imagers, or those with 1-dimensional sensors, have similar capabilities as laser scanners, 2-dimensional imagers, or those with 2-dimensional sensors, have additional capabilities and useful features. These features include the ability to scan general 2-dimensional barcodes, such as DataMatrix codes, and the ability to capture images, useful in such applications as capturing signatures and checks.

Existing imagers do not perform well when indicia are in motion because the target object must be positioned in front of the imager relatively steadily for a split second for the imager's camera to capture the target object's image without excessive blurring. This hold time is dependent upon many factors in the scanner design, and is typically in the order of 10 milliseconds.

It is anticipated that more and more applications requiring an imager will coexist with traditional scanning applications. For example, in a drug store, the operator of the scanner may need to scan the UPC (1-dimensional) barcode to check out a medicine, and at the same time need to scan the DataMatrix code to verify that the medicine has not expired. Or, in a liquor store, the operator may need to check out an alcoholic beverage and scan the PDF-417 barcode on the customer's driver's license for proof of age, while also capturing the customer's check to facilitate processing according to laws governing check processing.

Another area in which imagers can outperform laser scanners is the processing of truncated barcodes, such as those on small items like jewelry, pens and pencils, and candy. Traditionally these were scanned by a laser scanner, but alignment between the barcode and the laser scan line is often required on such a small item, preventing swipe operation with the laser scanner and slowing throughput.

SUMMARY

An imaging scan engine that includes both a solid-state camera and an illumination source in the same package simplifies the integration of swipe imaging components into scanners.

Accordingly, a scan engine includes a camera mounted on a scan engine chassis and an illumination source, such as one or more high-brightness LEDs, also mounted on the scan engine chassis. The scan engine chassis can be a printed circuit board on which the camera and illumination source are mounted. The illumination source is coupled with an optical element of the camera such that the divergence angle of light from the illumination source is approximately matched to a field-of-view of the camera. The camera can be a solid state camera having a two-dimensional CCD sensor or a two-dimensional CMOS sensor. One or more interfaces for inputting control signals may be present in the scan engine as well as one or more interfaces for outputting data and/or timing signals. A synchronization module can be part of the scan engine to synchronize the integration duration of the camera's sensor and the activation duration of the illumination source such that they occur substantially simultaneously and have substantially the same duration. The scan engine can also include a microprocessor and memory having instructions stored thereon for decoding indicia on objects whose image is captured by the camera.

A bi-optic imager includes a substantially vertical exit window, a horizontal exit window, and a plurality of cameras and associated illumination sources. Each camera can be mounted on a single scan engine chassis with its associated illumination source. The bi-optic imaging can include three cameras, two of which are aligned so that a field of view of each of the cameras is substantially contained within the vertical exit window. In this case, one of the cameras can be aligned so that a field of view of the camera is perpendicular to and substantially contained within the horizontal exit window. A camera control unit can activate each camera and its associated illumination source such that the integration periods for at least some of the cameras are non-overlapping in time. Such a bi-optic imager can include a buffer that stores images from each camera such that the images from the different cameras appear to be acquired at the same time.

These and other objects, advantages, and features of the exemplary embodiment of the invention are described in detail in conjunction with the accompanying drawings.

DETAILED DESCRIPTION

In order to make a swipe imager having a 2-dimensional sensor feasible, the scanning function of the imager must be able to be performed while the object bearing the indicium is in motion, preferable at object speeds over 10 inches per second. Such a swipe imager would be particularly advantageous as compared to laser scanners because with an imager the alignment of the barcode and imaging scanner is not an issue. The imaging scanner captures an image and creates virtual scan lines that are designed to pass through the barcode no matter at what angle it lies. A swipe imager that can function at relatively high object speeds could perform the functions described in the Background, such as capturing signatures and documents, reading DataMatrix codes, and capturing truncated barcodes, as well as performing equally as well on 1-dimensional barcodes as the traditional laser scanner. A swipe imager that utilizes strobe lighting, a global shutter, and synchronized illumination and exposure time to achieve relatively high speed performance is described in U.S. patent application Ser. No. 11/007,403 filed on Dec. 8, 2004, owned by the assignee of the present invention, and which is incorporated herein by reference in its entirety.

Figure 1:
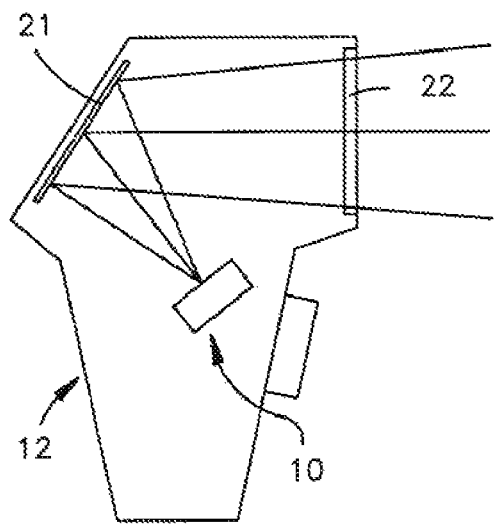
FIG. 1 is a schematic view of a handheld scanner incorporating an imager scan engine constructed in accordance with one embodiment of the present invention.
Figure 2A:
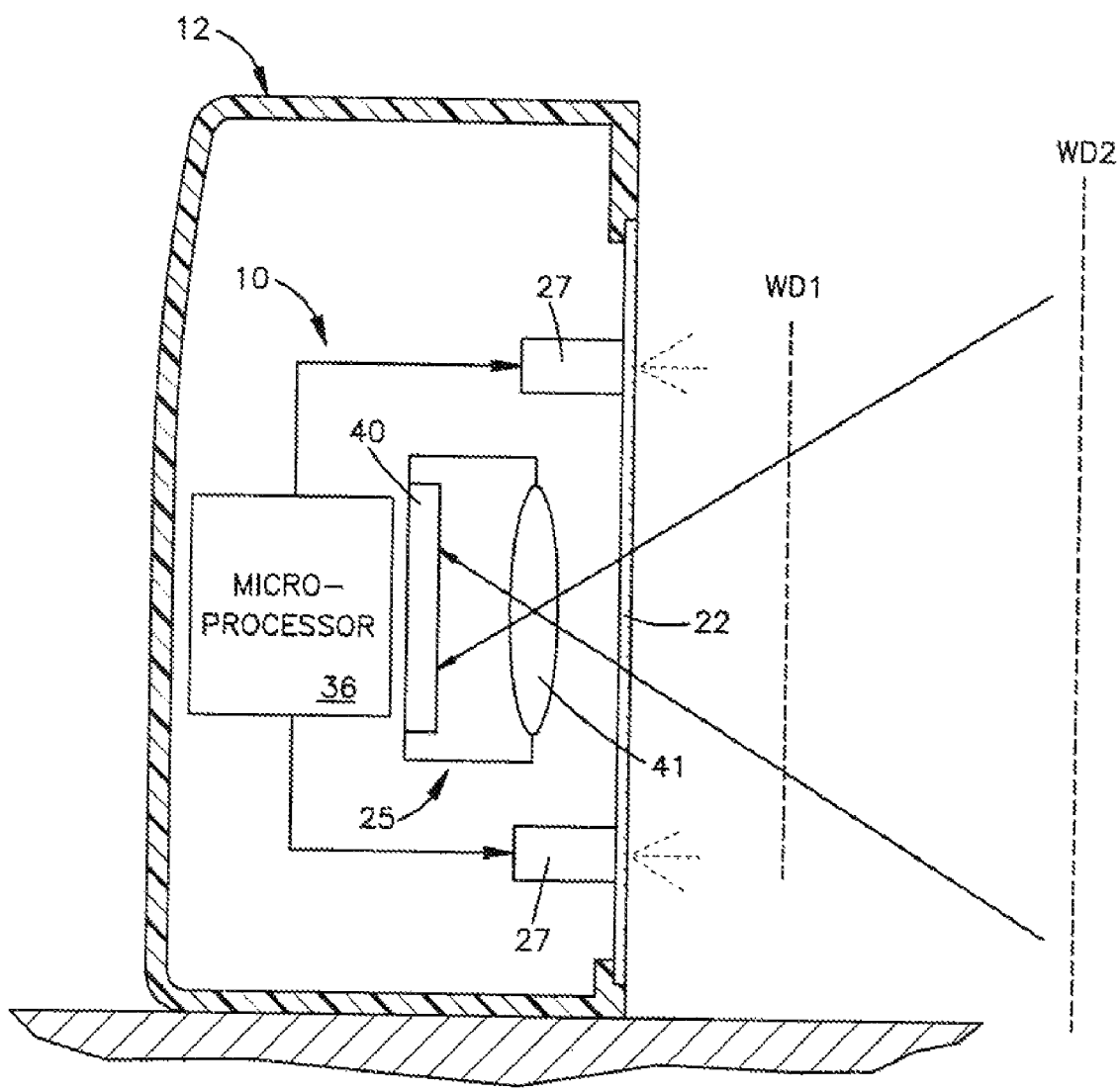
FIGS. 2a and 2b are schematic views of an imager scan engine constructed in accordance with one embodiment of the present invention.
Figure 2B:
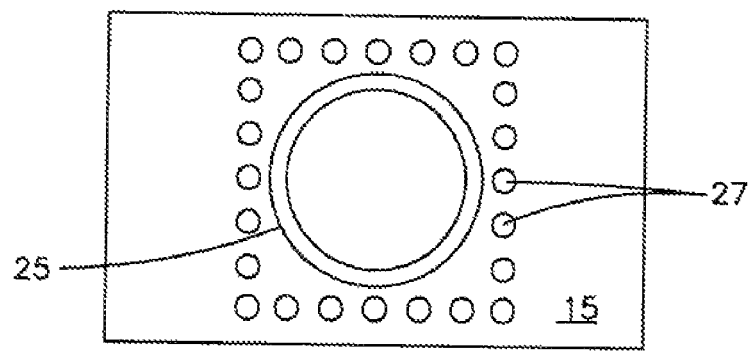

Accordingly, FIG. 1 illustrates a swipe imager 12 that incorporates a scan engine 10, a folding mirror 21, and exit window 22. FIGS. 2A and 2B show a more detailed view of the scan engine 10 housed within the imager 12 which includes a solid-state camera 25 and an illumination source that includes one or more high-brightness LEDs 27. Because it is designed to be incorporated into an imager or imaging scanner, it is advantageous that the scan engine has no enclosure separating it from its environment. The camera 25 and LEDs are mechanically and electrically integrated, such as being mounted on a single circuit board 15 that may also include a microprocessor 36 if the scan engine is to provide decoding operations or other components such as interface ports (not shown). The camera 25 includes as its sensor 40 a two-dimensional array sensor such as a CCD sensor or CMOS sensor. The LEDs 27 are tightly integrated with the camera 25 to form a scan engine housed on a single circuit board 15 that can be assembled into a scanner as a single component. The LEDs and camera can be controlled by the microprocessor 36, if one is present in the scan engine or by an external control unit (not shown) that activates the camera 25 and the LEDs 27 synchronously. For swipe performance the LEDs are pulsed for very short periods of time, such as on the order of 0.5 milliseconds or less. The duration of the pulses can be controlled to match the integration period of the camera. In addition, the illumination's divergence angle is approximately matched to the camera's field-of-view so that energy is conserved. Labels WD1 and WD2 depict near and far extremes of working ranges for a particular barcode, respectively. The exact locations of WD1 and WD2 depend on the characteristics of the barcode being scanned. In some cases it is advantageous, for certain important barcode types, such as regular sized UPC codes, to locate WD1 either on the window 22 or within the housing so such a barcode can be scanned while positioned in contact with the window.

Referring back to FIG. 1, the mirror 21 and the window 22 are both slightly extended from the requirement of the camera 25 so that the mirror and window do not too severely vignette the light coming from the LEDs. The scanner depicted is a handheld scanner that can be used as a hands-free when coupled to a base. Because the illumination source (LEDs) is positioned so closely to the camera, the illumination light path is not shown separately in FIG. 1.

Figure 3A:
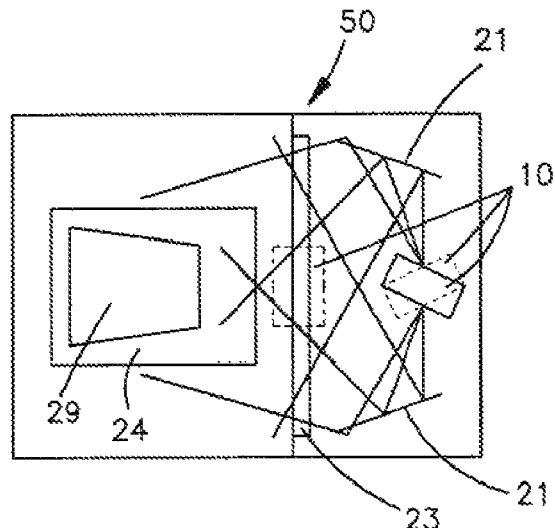
FIGS. 3a-3c are projection views of a bi-optic scanning system utilizing scan engines constructed in accordance with one embodiment of the present invention.
Figure 3B:
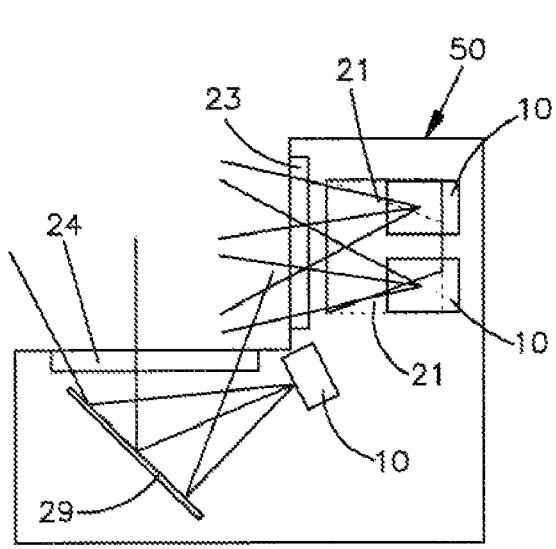
Figure 3C:
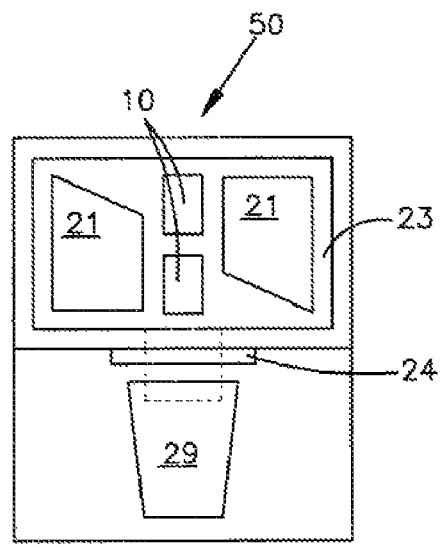

FIGS. 3a-3c are projection views of a bi-optic scanning system 50. FIG. 3a shows top view of the bi-optic scanner, FIG. 3b is a front view, and 3c is a view from the left-hand side of the scanning system. The scanning system 50 incorporates three cameras, which can advantageously be packaged as part of three swipe scan engines 10, with two of them covering the vertical window 23 and one of them covering the horizontal window 24. The scan engine that is used to cover the horizontal window has its optical axis substantially perpendicular to the exit window 24 of the scanner (due to folding mirror 29) such that there is virtually no geometrical distortion. Such a distortion-free image capture capability is good for certain expanded features of a point-of-sale scanner, such as signature capture and check scanning, etc. This feature is also more advantageously associated with the horizontal window, because the vertical window is usually larger and therefore it is harder to define a small sub-region for such image capturing needs.

The two scan engines covering the vertical scan window 23 have an up-and-down arrangement and act upon vertical folding mirrors 21. The scan engines, due to their small size, could also be arranged on essentially the same horizontal plane. It is advantageous, however, to place the scan engines in an asymmetrical fashion as shown in FIG. 3a. This arrangement allows more complimentary coverage of the top and bottom sides of the object being scanned. The mirror arrangements can be further tilted in such as way as to make the top and bottom side coverage more substantial.

The incorporation of the illumination source LEDs with each of the cameras in a single scan engine unit helps to reduce design complexity as the illumination sources are guaranteed to match the camera in both the direction and the field-of-view.

To avoid scattered illumination from one scan engine entering a camera for another scan engine as background noise, it is advantageous to make the different cameras capture images during non-overlapping time intervals. For example, if each camera is to have an exposure of 0.3 milliseconds, the three cameras can have their exposures set at three consecutive 0.3 millisecond intervals. The maximum delay between the cameras is then 0.6 milliseconds. Having only a small delay between the cameras can be advantageous if it is desirable to have their images processed in a synchronized way. To synchronize the image processing when two or more cameras are operating at slightly different times a first-in-first-out buffer can be used to store up the data from each camera that is ahead of the latest camera.

The bi-optic scanning system 50 has several advantages made possible by the scan engine units 10 that each efficiently packages a camera and illumination source. All three cameras can be located in close vicinity of each other, reducing the length of any cables that are needed to link them together. The data connection between a camera and processing unit carries a high-frequency signal and is therefore prone to generating radiation noise and is susceptible to high-frequency noise from the environment. The close proximity of the three cameras allows the three cameras to send their data to one combined processing unit, without long cables that may generate or receive too much radiation noise. The scan engine unit 10 is also easily incorporated into new and existing designs to provide swipe-scanning capability.

It can be seen from the foregoing description that providing a scan engine with a camera and illumination source is close proximity to one another simplifies integration of swipe imager performance into new and existing products. Although the invention has been described with a certain degree of particularity, it should be understood that various changes can be made by those skilled in the art without departing from the spirit or scope of the invention as hereinafter claimed.

We claim:

1. A bi-optic imager comprising a first exit window, a second exit window transverse to the first window, and a plurality of cameras, each camera of the plurality of cameras having an associated illumination source, a first camera and its associated illumination source being positioned such that a field of view of the first camera projects through the first exit window to capture an image adjacent the first exit window during an exposure time period of the first camera and a second camera and its associated illumination source being positioned such that a field of view of the second camera projects through the second exit window to capture an image adjacent the second exit window during an exposure time period of the second camera, the first and second cameras being activated consecutively such that exposure time periods of the first camera are non-overlapping with exposure time periods of the second camera, the illumination source associated with the first camera generating a series of illumination pulses synchronized with the exposure time periods of the first camera to be substantially simultaneous in timing and duration with the exposure time periods of the first camera and the illumination source associated with the second camera generating a series of illumination pulses synchronized with the exposure time periods of the second camera to be substantially simultaneous in timing and duration with the exposure time periods of the second camera.

2. The bi-optic imager of claim 1 wherein each camera and its associated illumination source are mounted on a single scan engine chassis.

3. The bi-optic imager of claim 2 wherein the scan engine chassis is a printed circuit board on which the camera and illumination source are mounted.

4. The bi-optic imager of claim 1 comprising a third camera, the first camera and the third camera being aligned such that a field of view of the first camera and the third camera project through the first exit window.

5. The bi-optic imager of claim 1 wherein the field of view of the second camera intersects a folding mirror and is directed by the folding mirror through the second exit window.

6. The bi-optic imager of claim 1 further including a camera control unit that activates each camera of the plurality of cameras and its associated illumination source such that exposure periods for all of the cameras are non-overlapping in time.

7. The bi-optic imager of claim 1 comprising a buffer that stores images from each camera of the plurality of cameras such that the images from the different cameras appear to be acquired at the same time.

8. The bi-optic imager of claim 1 wherein the first exit window is substantially vertical and the second exit window is substantially horizontal.

9. The bi-optic imager of claim 1 wherein for each illumination source, the illumination source includes one or more LEDs.

10. The bi-optic imager of claim 1 wherein for each camera of the plurality of cameras, the camera includes an optic element to focus illumination from the field of view of the camera onto a sensor of the camera.

11. The bi-optic imager of claim 1 wherein for each illumination source and for each camera of the plurality of cameras, the illumination source is configured with respect to its associated camera such that a divergence angle of light from the illumination source is approximately matched to the field-of-view of the camera.

12. The bi-optic imager of claim 1 wherein for each camera of the plurality of cameras, the camera is a solid state camera having a two-dimensional CCD sensor.

13. The bi-optic imager of claim 1 wherein for each camera of the plurality of cameras, the camera is a solid state camera having a two-dimensional CMOS sensor.

14. The bi-optic imager of claim 1 wherein for each camera of the plurality of cameras, the camera includes one or more interfaces for inputting control signals and one or more interfaces for outputting data and/or timing signals.

15. A bi-optic scanning system comprising a first exit window, a second exit window transverse to the first exist window, and a plurality of cameras, each camera of the plurality of cameras being associated with a respective illumination source;
a first camera and its associated illumination source being positioned such that a field of view of the first camera projects through the first exit window to capture an image adjacent the first exit window during an integration period of the first camera and a second camera and its associated illumination source being positioned such that a field of view of the second camera projects through the second exit window to capture an image adjacent the second exit window during an integration period of the second camera;
the first and second cameras being activated consecutively such that integration periods of the first camera are non-overlapping with integration time periods of the second camera.

16. The bi-optic scanning system of claim 15 wherein the first exit window is substantially vertical and the second exit window is substantially horizontal.

17. The bi-optic scanning system of claim 16 wherein the field of view of the second camera intersects a folding mirror and is directed by the folding mirror through the second exit window.

18. The bi-optic scanning system of claim 15 wherein each camera and its associated illumination source are mounted on a single scan engine chassis.

19. The bi-optic scanning system of claim 15 comprising a third camera, the first camera and the third camera being aligned such that a field of view of the first camera and the third camera project through the first exit window.

20. The bi-optic scanning system of claim 15 further including a camera control unit that activates each camera of the plurality of cameras and its associated illumination source such that integration periods for all of the cameras are non-overlapping in time.

21. The bi-optic scanning system of claim 15 further comprising a buffer that stores images from each camera of the plurality of cameras such that the images from the different cameras appear to be acquired at the same time.

22. The bi-optic scanning system of claim 15 wherein the field of view of the first camera intersects a folding mirror and is directed by the folding mirror through the first exit window.

23. The bi-optic scanning system of claim 15 wherein the illumination source associated with the first camera generates a series of illumination pulses synchronized with the integration periods of the first camera to be substantially simultaneous in timing and duration as the integration periods of the first camera and the illumination source associated with the second camera generates a series of illumination pulses synchronized with the integration periods of the second camera to be substantially simultaneous in timing and duration with the integration periods of the second camera.

* * * * *

UNITED STATES PATENT AND TRADEMARK OFFICE
CERTIFICATE OF CORRECTION

PATENT NO. : 7,823,787 B2  
APPLICATION NO. : 11/870592  
DATED : November 2, 2010  
INVENTOR(S) : He et al.

Page 1 of 1

It is certified that error appears in the above-identified patent and that said Letters Patent is hereby corrected as shown below:

TITLE PAGE

On the Face Page, in Field (63), under "Related U.S. Application Data", in Column 1, Lines 1-2, delete "Continuation of application No. 11/263,520, filed on Oct. 31, 2005, now Pat. No. 7,296,744" and insert -- This application is a Division of application serial no. 11/263,520, filed on October 31, 2005, now U.S. Pat. No. 7,296,744, which is a continuation-in-part of application serial no. 11/007,403, filed on Dec. 8, 2004, now U.S. Pat No. 7,204,418. --, therefor.

IN THE SPECIFICATION

In Column 2, Line 36, delete "imaging" and insert -- imager --, therefor.

In Column 4, Line 60, delete "is" and insert -- in --, therefor.

Signed and Sealed this  
First Day of May, 2012

David J. Kappos  
*Director of the United States Patent and Trademark Office*